United States Patent [19]

Wischusen, III et al.

[11] Patent Number: 4,923,239
[45] Date of Patent: May 8, 1990

[54] VEHICLE SUN SCREEN

[75] Inventors: Henry Wischusen, III, Lilburn, Ga.; William L. Champion, Estill Springs, Tenn.

[73] Assignee: Rock-Tenn Company, Norcross, Ga.

[21] Appl. No.: 355,434

[22] Filed: May 22, 1989

Related U.S. Application Data

[63] Continuation-in-part of Ser. No. 193,397, May 12, 1988, Pat. No. 4,838,600.

[51] Int. Cl.$^5$ .................................................. B60J 1/20
[52] U.S. Cl. ................................. 296/97.7; 296/97.8; 160/370.2
[58] Field of Search ............... 296/97.7, 97.8, 97.1; 160/370.2

[56] References Cited

U.S. PATENT DOCUMENTS

| | | | |
|---|---|---|---|
| 1,505,839 | 8/1924 | Wood | 296/97.1 |
| 3,003,812 | 10/1961 | Hangland | 296/97.7 |
| 3,336,969 | 8/1967 | Marchman | 160/370.2 |
| 4,109,484 | 8/1978 | Cunningham | 160/370.2 |
| 4,202,396 | 5/1980 | Levy | 296/97.7 |
| 4,652,039 | 3/1987 | Richards | 296/97.7 |
| 4,671,334 | 6/1987 | Yadegar et al. | 296/97.8 |
| 4,727,920 | 3/1988 | Siegler | 296/97.8 |
| 4,751,115 | 6/1988 | Smith et al. | 296/97.7 |
| 4,763,947 | 8/1988 | Gregg | 296/97.7 |

Primary Examiner—Robert R. Song
Attorney, Agent, or Firm—Jones, Askew & Lunsford

[57] ABSTRACT

A sun screen for placement inside an automobile or truck windshield to reflect sunlight defines a triangular central panel and a pair of wing panels foldable into the vehicle. The sun screen can be folded into a storage configuration with only four folds. A large display area is provided in the storage configuration. A tear away coupon is provided at the location at which the rear view mirror may interfere with the sun screen.

11 Claims, 5 Drawing Sheets

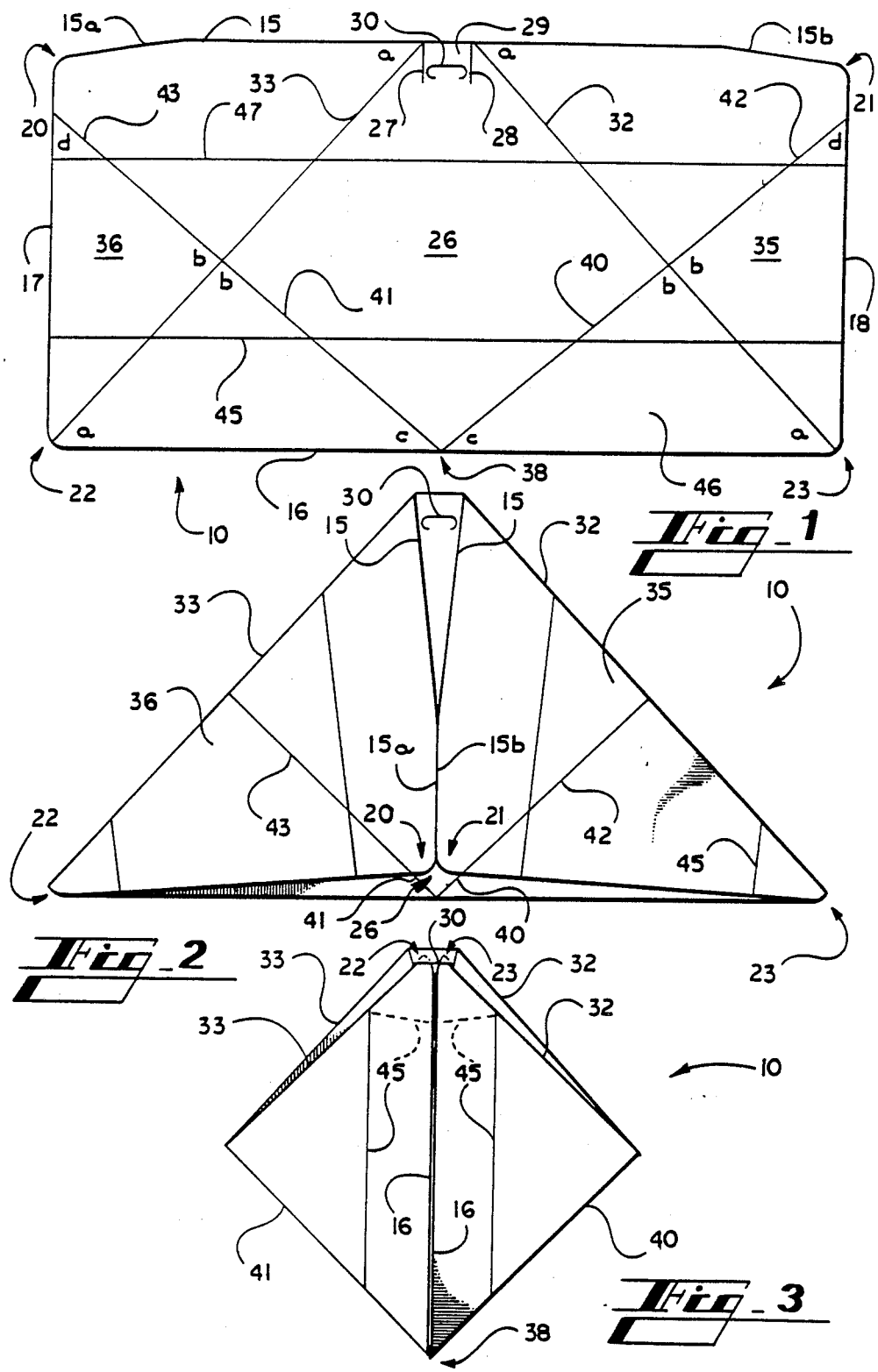

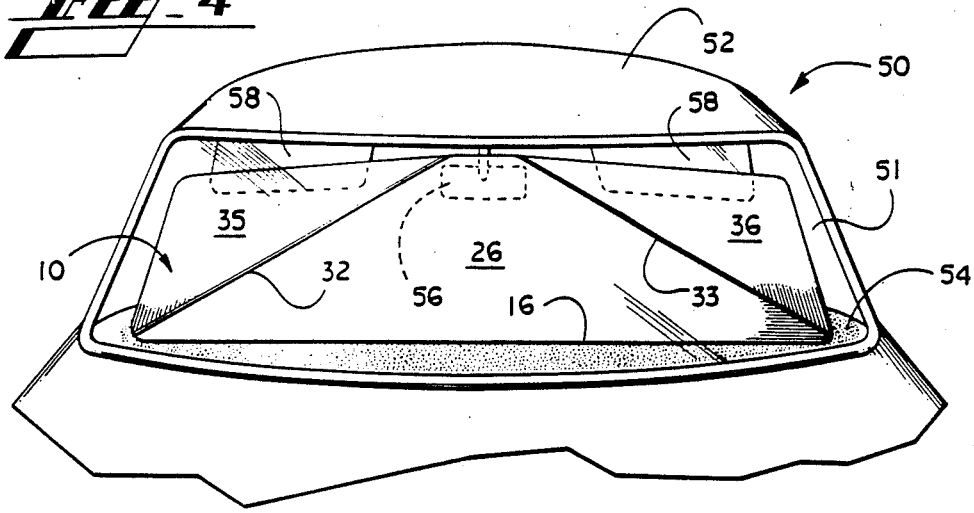
Fig_4
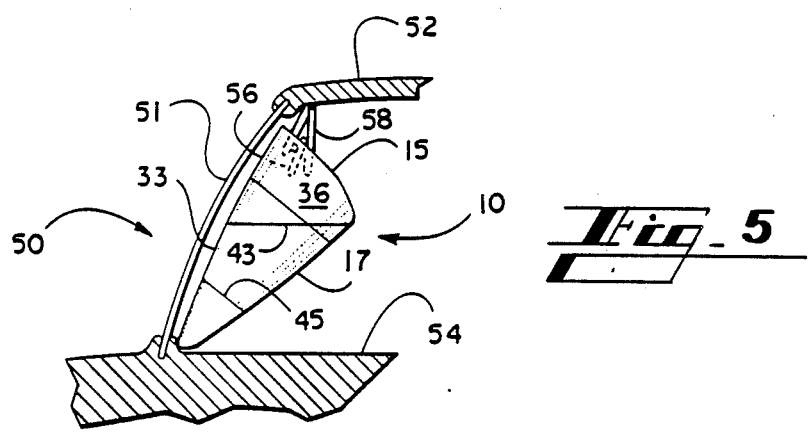
Fig_5
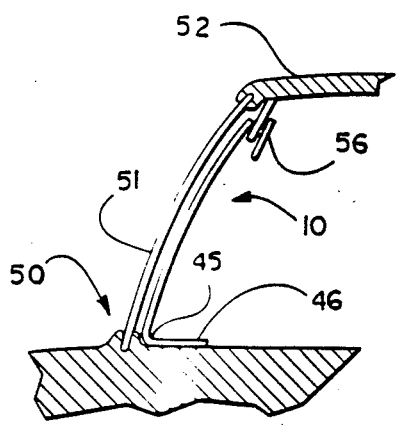
Fig_6

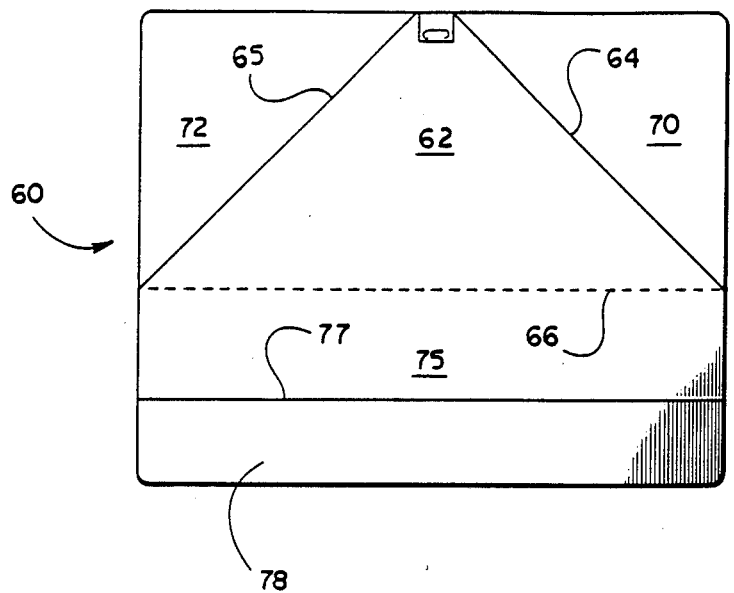
Fig_7
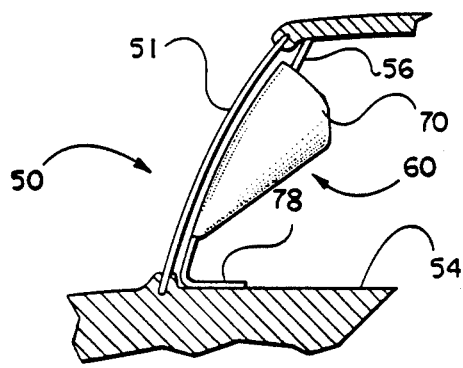
Fig_8

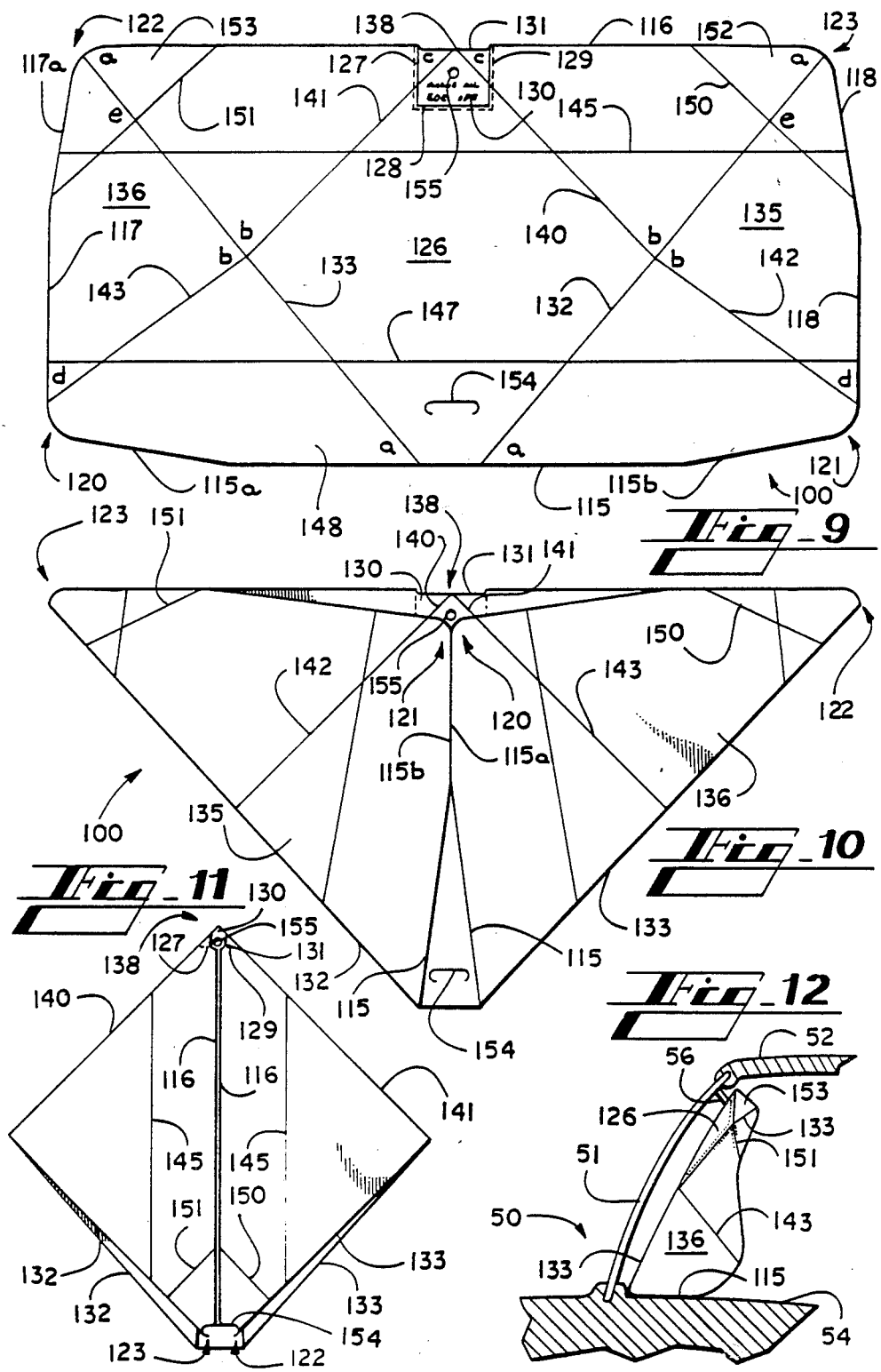

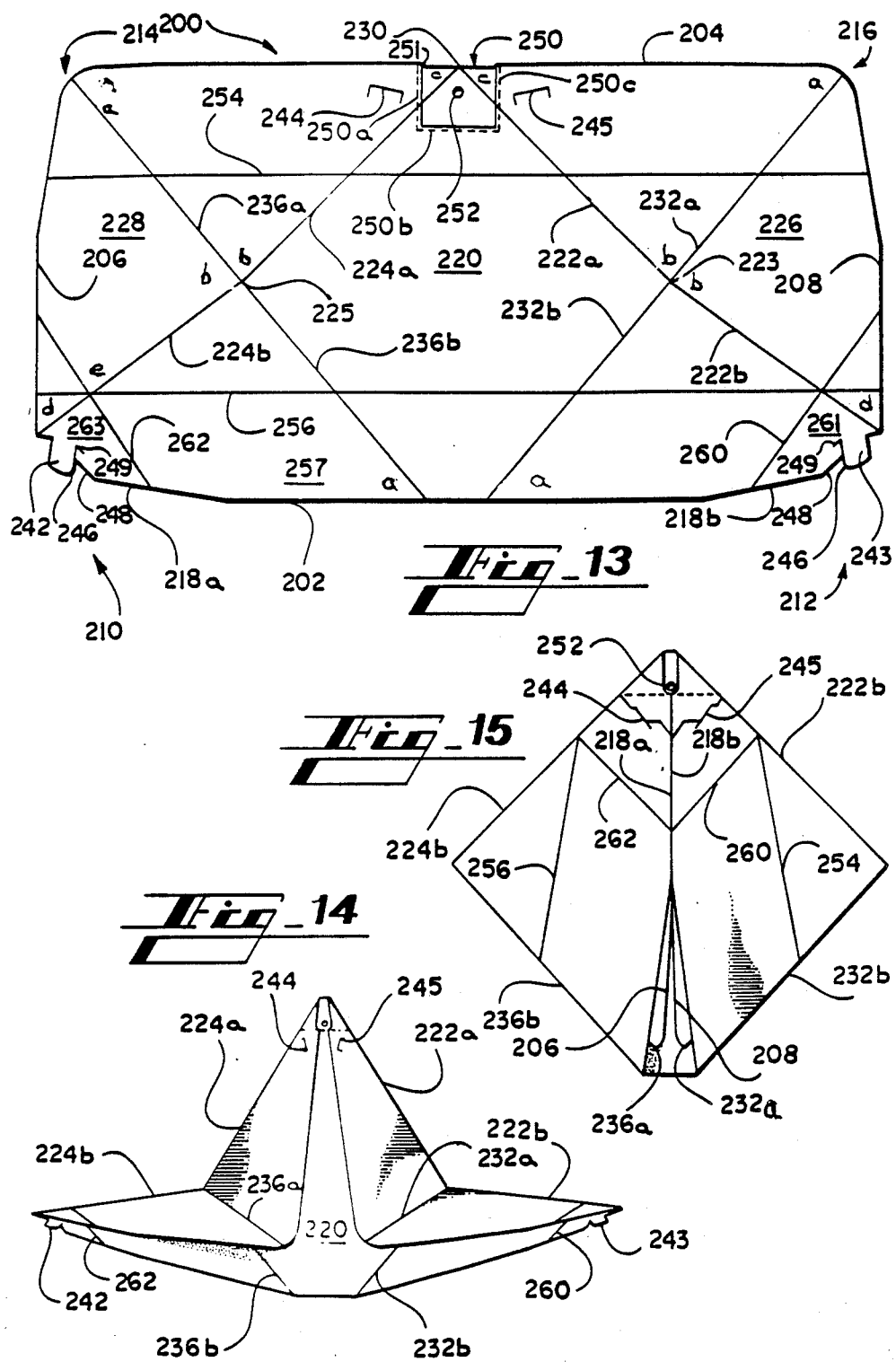

VEHICLE SUN SCREEN

CROSS REFERENCE TO RELATED APPLICATION

This application is a continuation-in-part application of copending application Ser. No. 193,397 filed May 12, 1988, now U.S. Pat. No. 4,838,600.

TECHNICAL FIELD

The present invention relates to screens utilized on the interior of vehicles to reflect the sun's rays out of the vehicle to prevent overheating of the vehicle, and more particularly relates to such a screen suitable for use inside windshields of cars or trucks.

BACKGROUND ART

Many types of curtains, blinds, and screens have been developed for the purpose of blocking entry of solar radiation or glare into vehicles. Many prior designs have required permanent installation of a shade or screen, which may be collapsible when use is not desired. Some devices are foldable into the collapsed configuration, while others retract to a non-use position. The need for window screens that can be secured in place temporarily and folded or rolled into a small package for storage has also been recognized. Prior devices of interest in the field include those described in U.S. Pat. Nos. 1,018,498; 2,305,677; 2,804,135; 2,855,241; and 3,003,812.

U.S. Pat. No. 4,202,396 discloses a sunshield intended to be placed inside the windshield of an automobile while the automobile is not in use. The shield is made of corrugated cardboard scored to permit accordion folding of the large rectangular sheet into a smaller package for storage during operation of the vehicle. The package is expanded and slipped behind the rear view mirror to block the windshield, and the sun visors may also be used to hold the shield in place.

In order to prevent the multiple panel device disclosed in this patent from collapsing during use, the foldable connections between panels extend at right angles from the lower margin of the windshield, that is, vertically. Thus, the shield has no transverse rigidity unless it is folded across all the accordion folds, which reduces the ability of the device to adapt to different windshield shapes and widths. To accommodate the fact that most modern cars have windshields that are narrower at the top than at the bottom, the device must partially collapse at the top. The weight distribution of the installed device is thereafter unbalanced, with the result of a tendency of the device to fall away from the window.

Another disadvantage of the accordion folded shield is the number of folds required to collapse the device. Seven to nine folds are shown in the patent. Furthermore, the surface available for display of advertising is quite small when the shield is collapsed.

While the sun screen disclosed in copending parent application Ser. No. 193,397, filed May 12, 1988, which is incorporated by reference in its entirety herein, is adequate for the purposes described, problems have arisen from the fold configuration in which an inner fold rests tightly within an outer fold. It has been found that there is a strain placed on the outer fold line by the inner fold being jammed into the outer fold when the sun screen is collapsed. This strain can cause premature tearing of the outer fold line. There is a need then, for a sun screen which has the folds designed to avoid such strain when the screen is collapsed.

SUMMARY OF THE INVENTION

The present invention provides an improved sun screen that has good transverse and vertical rigidity and accommodates readily to the shape of modern windshields. In the preferred configurations, the sun screen folds into a compact package for storage in only four folds.

Generally described, the present invention provides a vehicle having a windshield, a dashboard or like surface extending below the windshield, and, positioned inside the windshield, a sun screen comprising a generally triangular central portion positioned adjacent to the windshield; and a pair of wing members foldably connected to the sides of the triangular central portion, each angled inwardly with respect to the plane of the central portion. In one preferred embodiment, the apex of the central portion is positioned near the top center of the windshield with the base resting along the dashboard. In another preferred embodiment, the apex of the central portion rests on the dashboard, and the base extends along the upper region of the windshield.

The sun screen can be made of a sheet of foldable material defining the central portion and the wing members, preferably corrugated cardboard or thick paperboard. The wing members are preferably generally triangular panels. In order to adjust the height or provide a base panel, the sun screen can further define a first horizontal fold line spaced upwardly from the bottom of the sun screen and/or a second horizontal fold line spaced downwardly from the top of the sun screen.

The invention also provides a sun screen having an expanded configuration adapted for placement in a vehicle windshield and a folded configuration for storage, comprising a generally rectangular sheet of material defining upper right, upper left, lower right, and lower left corners, and top and bottom edges; a first fold line extending from adjacent to the center of the top edge to a point adjacent to the lower right corner so as to define a generally triangular right wing panel which includes the upper right corner; a second fold line extending from adjacent to the center of the top edge to a point adjacent to the lower left corner so as to define a generally triangular left wing panel which includes the upper left corner; a third fold line extending from adjacent to the center of the bottom edge to a point intermediate the ends of the first fold line; a fourth fold line extending from adjacent to the center of the bottom edge to a point intermediate the ends of the second fold line; a fifth fold line extending from the intersection of the first and third fold lines to a point adjacent to the upper right corner; and a sixth fold line extending from the intersection of the second and fourth fold lines to a point adjacent to the upper left corner; the wing panels being foldable about the first and second fold lines to place the fifth fold line along the third fold line and the sixth fold line along the fourth fold line; and the lower corners being foldable about the combined third and fifth and the combined fourth and sixth fold lines to positions adjacent to the center of the top edge of the sheet, whereby the sun screen is in the folded configuration. A locking device can be provided, such as a slit for receiving both the bottom corners and retaining them in position adjacent to the center of the top edge.

Horizontal fold lines can be provided in the sheet as described above. A horizontal fold line spaced a short distance from the bottom edge will assume a position in the folded configuration of the sun screen so as to effectively weaken the lower corners to make them more easily insertable into the slit.

Alternately, the invention provides a sun screen having an expanded configuration adapted for placement in a vehicle window and a folded configuration for storage, comprising a generally rectangular sheet of material defining upper right, upper left, lower right, and lower left corners, and top and bottom edges; a first fold line extending from adjacent to the center of the bottom edge to a point adjacent to the upper right corner so as to define a generally triangular right wing panel which includes the lower right corner; a second fold line extending from adjacent to the center of the bottom edge to a point adjacent to the upper left corner so as to define a generally triangular left wing panel which includes the lower left corner; a third fold line extending from adjacent to the center of the top edge to a point intermediate the ends of the first fold line; a fourth fold line extending from adjacent to the center of the top edge to a point intermediate the ends of the second fold line; a fifth fold line extending from the intersection of the first and third fold lines to a point adjacent to the lower right corner; and a sixth fold line extending from the intersection of the second and fourth fold lines to a point adjacent to the lower left corner; the wing panels being foldable about the first and second fold lines to place the fifth fold line along the third fold line and the sixth fold line along the fourth fold line; and the upper corners being foldable about the combined third and fifth and the combined fourth and sixth fold lines to positions adjacent to the center of the bottom edge of the sheet, whereby the sun screen is in the folded configuration. The sheet may also include a pair of fold lines across the upper corners so as to define a pair of generally triangular corner panels. The corner panels may fold into the vehicle to accommodate narrowing of the windshield, and also weaken the upper corners for insertion into a locking slit.

The foregoing two alternative configurations of a sun screen embodying the invention are similar in construction, while being opposite in orientation in the vehicle. In the first configuration, the wing panels fold down and in from the upper corners. In the second configuration, the wing panels fold in from the bottom corners, and the sun screen tends to be supported on the wing panels, which rest on the dashboard.

The invention also provides a sun screen for a vehicle having a windshield and a rear view mirror assembly mounted adjacent to the top center of the windshield, comprising a panel adapted to be placed adjacent to the windshield; and a removable section defined in the panel such that the panel fits around the mirror assembly when the removable section is removed; the removable section comprising a redeemable coupon.

In yet another alternative embodiment, the invention provides a sun screen having an expanded configuration adapted for placement in a vehicle windshield and a folded configuration for storage, comprising: a generally rectangular sheet of material defining upper right, upper left, lower right, and lower left corners, and top and bottom edges; a first fold line extending from the center of the top edge to a point adjacent to the lower right corner so as to define a generally triangular right wing panel which includes the upper right corner, the first fold line comprising a pair of non-collinear first fold line segments joined at one end of each of the first fold line segments; a second fold line extending from the center of the top edge to a point adjacent to the lower left corner so as to define a generally triangular left wing panel which includes the upper left corner, the second fold line comprising a pair of non-collinear second fold line segments joined at one end of each of the second fold line segments; such that when the wing panels are folded inwardly, the lower right and left corners are encouraged to fold to positions adjacent to the center of the top edge of the sheet.

The offset positions of the adjacent third and fourth fold line segments (and fifth and sixth fold line segments) prevents tearing of the outer layers of material even though a double thickness of material is being folded.

Thus, it is an object of the present invention to provide an improved interior sun screen for windshields and the like.

It is a further object of the present invention to provide a sun screen which has horizontal and vertical rigidity.

It is a further object of the present invention to provide a sun screen which adapts well to windshields that become narrower at the roof of a vehicle.

It is a further object of the present invention to provide a sun screen that is foldable into a storage configuration with a minimum of folds.

It is a further object of the present invention to provide a sun screen that provides a large display area in its storage configuration.

It is a further object of the present invention to provide a sun screen that effectively presents promotional information through printed advertising and redeemable coupons.

It is a further object of the present invention to provide a sun screen that effectively reflects sunlight passing through the windshield of a parked automobile or truck.

It is yet a further object of the present invention to provide a sun screen that can be repeatedly folded and unfolded with minimal strain so as to avoid tearing along the fold lines.

Other objects, features, and advantages of the present invention will become apparent upon reading the following detailed description of embodiments of the invention, when taken in conjunction with the accompanying drawing and the appended claims.

BRIEF DESCRIPTION OF THE DRAWING

FIG. 1 is a plan view of the interior side of a blank utilized to form a sun screen embodying the present invention.

FIG. 2 is a plan view of the blank of FIG. 1 after the wing panels have been folded onto the central panel.

FIG. 3 is a plan view of the blank of FIGS. 2 and 3 after final folding into the storage configuration.

FIG. 4 is a pictorial view of the sun screen of FIG. 1 installed in an automobile.

FIG. 5 is a vertical cross sectional view of the automobile showing a side view of the installed sun screen.

FIG. 6 is a vertical cross sectional view of an automobile showing the sun screen installed in an alternate configuration.

FIG. 7 is a plan view of a blank used to form a second embodiment of the sun screen of the present invention.

FIG. 8 is a vertical cross sectional view of an automobile showing a side view of the sun screen of FIG. 7 installed in the windshield.

FIG. 9 is a plan view of the interior side of a blank utilized to form a third embodiment of a sun screen of the present invention.

FIG. 10 is a plan view of the blank of FIG. 9 after the wing panels have been folded onto the central panel.

FIG. 11 is a plan view of the blank of FIGS. 9 and 10 after final folding into the storage configuration.

FIG. 12 is a vertical cross sectional view of an automobile showing a side view of the installed sun screen according to the third embodiment of the invention.

FIG. 13 is a plan view of the interior side of a blank utilized to form an alternative embodiment of a sun screen of the present invention.

FIG. 14 is a plan view of the blank of FIG. 13 after the wing panels have been partially folded onto the central panel.

FIG. 15 is a plan view of the blank of FIGS. 13 and 14 after final folding into the storage configuration.

DETAILED DESCRIPTION

Referring now in more detail to the drawing, in which like numerals represent like parts throughout the several views, FIG. 1 shows a sun screen 10 in the form of a flat blank cut and scored to accomplish the purpose of the present invention. The blank is generally rectangular in shape, and defines a top edge 15, bottom edge 16, left side edge 17 and right side edge 18. The corners, upper left 20, upper right 21, lower left 22 and lower right 23, are rounded. The top edge 15 is slightly beveled near the corners 20 and 21 at 15a and 15b, respectively, so as to prevent interference of the upper corners upon folding, as shown in FIG. 2.

The dimensions of the blank may be selected to allow the sun screen to fit behind the windshields of most automobiles, or may be custom fit for a particular model of automobile or truck. In the preferred embodiment shown, the side edges are about half the length of the top and bottom edges. One example of dimensions for a sun screen embodying the invention, not intended to limit the scope of the invention, is a height of twenty-three inches and a width of forty-seven inches.

The sun screen 10 can be constructed of any suitable foldable material. The preferred material is corrugated cardboard, but stiff paperboard or foldable plastic sheet material could be used. The invention could also be made using rigid material connected with hinges.

Straddling the center point of the top edge 15, a pair of spaced apart cut lines 27 and 28 are optionally cut a short distance into the sheet 10. Between them they define a foldable panel 29. A generally horizontal slit 30 is cut in the panel 29 for use as a locking mechanism described below. The terminal points of the slit 30 may be relieved by downwardly curving cuts as shown. The slit 30 is cut in the same position if the cut lines 27 and 28 are not present.

A generally triangular central panel 26 is defined by a first diagonal fold line 32, which extends from the intersection of the cut line 28 and the top edge 15 to the lower right corner 23, a second diagonal fold line 33, which extends from the intersection of the cut line 27 and the top edge 15 to the lower left corner 22, and the bottom edge 16. Thus, the apex of the triangle is at the top center of the blank, the sides are the fold lines 32 and 33, and the base is the bottom edge 16. The fold lines 32 and 33 also define right and left wing panels 35 and 36, respectively, and foldably connect the wing panels to the central panel.

A third diagonal fold line segment 40 extends from the center of the bottom edge at point 38 toward the upper right corner 21, at approximately a forty-five degree angle from the bottom edge, terminating at the first fold line 32. A similar fourth fold line segment 41 extends from the point 38 to the second fold line 33. From the point at which the segment 40 meets the fold line 32, a fifth fold line segment 42 extends to the right side edge 18 at a point spaced slightly downwardly from the upper right corner 21. The segment 42 is positioned such that when the right wing panel 35 is folded about the fold line 32 onto the central panel 26, the segment 42 will lie along the segment 40, as shown in FIG. 2. A sixth fold line segment 43 is similarly positioned extending from the second fold line 33 to a point spaced from the upper left corner 20. The segment 43 lies along the segment 41 when the left wing panel 36 is folded as shown in FIG. 2.

The blank is crossed by two optional horizontal fold lines, the function of which is described below. A first horizontal fold line 45 is parallel to and spaced upwardly from the bottom edge 16. Fold line 45 may advantageously be placed at about one-quarter of the distance from the bottom edge to the top edge. A base panel 46 is defined along the bottom of the blank by the fold line 45. A second horizontal fold line 47 extends across the blank parallel to the top edge, preferably spaced at about one-quarter of the distance from the top edge to the bottom edge.

The fold lines of the preferred embodiment described above are positioned to permit folding of the blank into a storage configuration shown in FIG. 3. Thus, the first and second diagonal fold lines 32 and 33 each form angles a of about 50 degrees with the top and bottom edges. The third and fourth fold lines 40 and 41 meet the fold lines 32 and 33, respectively, at angles b (opening toward the bottom edge) of about 85 degrees. The fifth and sixth fold lines 42 and 43 also meet the fold lines 32 and 33, respectively, at angles b (opening toward the side edges) of about 85 degrees. The second and third fold lines 40 and 41 form angles c of about 45 degrees with the bottom edge. Finally, the fifth and sixth fold lines 42 and 43 form angles d of about 55 degrees with the side edges. The scope of the invention is not intended to be limited to the above set of angles.

Referring now to FIGS. 2 and 3, the sequence of steps for folding the sun screen 10 into a storage configuration is shown. An advantage of the present invention is that only four folds are required to collapse the sun screen 10 into its storage configuration. Initially, the right and left wing panels 35 and 36 are folded about the first and second fold lines 32 and 33, respectively, onto the central panel 26. The trimmed sections 15a and 15b of the top edge meet at the center of the blank, and the fold line segments 42 and 43 lie along the segments 40 and 41, respectively. This intermediate configuration is shown in FIG. 2. Then, the lower corners 22 and 23 are folded about the double fold lines 41/43 and 40/42 to place the lower corners in positions slightly overlying the slit 30 adjacent to the top center of the blank. The folded sun screen now is generally in the shape of a quadrilateral with the halves of the bottom edge 16 lying adjacent to one another diagonally across the quadrilateral.

The bottom corners 22 and 23 may now be inserted through the slit 30 to retain or lock the sun screen in its storage configuration, as shown in FIG. 3. Slight bending of the two-layer corners prior to insertion into the slit is facilitated by the configuration of the horizontal fold line 45. After folding, the outside end portions of the fold line 45 cross the inner layer of the folded corners, as shown in dotted lines in FIG. 3. A weakening is thus created, making it easier to bend a small triangular portion adjacent to the corners 22 and 23 for insertion into the slot 30.

In the storage configuration, the sun screen 10 is compact enough to easily stow on or under a seat in the vehicle, but provides a large display area consisting of a quadrilateral bounded by the fold lines 32, 33, 40 and 41, on the reverse side from that shown in FIG. 3.

The sun screen 10 is intended for use most effectively in the windshield of an automobile or truck, although it may also be placed inside the rear window of a vehicle or other windows. FIG. 4 shows the sun screen 10 installed inside the windshield 51 of a car 50. Also shown are other typical components of the car 50, namely, a dashboard 54 or similar platform extending along the base of the windshield 51, a rear view mirror 56 extending down from a roof 52, and a pair of sun visors 58 pivotally attached to the roof on either side of the mirror 56.

Although the preferred embodiment of the sun screen shown in FIGS. 1–3 defines many fold lines, only fold lines defining a generally triangular central portion and wing panels connected to the sides of the triangle are required to practice the present invention. As will be seen by comparing the foregoing description to the third embodiment below, the wing panels may fold inwardly from the upper corners or from the bottom corners.

In the first preferred embodiment of FIGS. 1–3, the bottom edge 16, forming the base of the triangular central portion 26, rests along the dashboard 54. The apex of the central portion 26 is positioned between the rear view mirror 56 and the windshield 51. If helpful in fitting the screen with respect to the mirror 56, the cut lines 27 and 28 may be provided, allowing the panel 29 to fold to accommodate the mirror. The wing panels 35 and 36 are folded slightly into the car to accommodate the narrowing of the windshield near the roof, best seen in FIG. 4. The sun visors 58 can be partially lowered to engage the top edges of the wing panels in order to assist in keeping the sun screen in position.

FIG. 5 shows a side view of the sun screen 10 installed in the windshield. The wing panels present a reflecting surface which is capable of preventing sunlight entering from the side, as well as the front, of the automobile.

If the windshield is shorter than the sun screen 10, the sun screen can be folded about the fold line 45, as shown in FIG. 6. The base panel 46 thus rests on the dashboard 54. The angle formed between the base panel 46 and the remainder of the sun screen in this configuration prevents significant inward folding of the wing panels 35 and 36.

When the operator of the vehicle is ready to drive it, the sun screen 10 can easily be removed from the windshield and folded into the storage configuration with only four folds, as described above in connection with FIGS. 2 and 3.

A second embodiment of the present invention is shown in FIGS. 7 and 8. A sun screen 60 defines a central triangular portion 62 which does not extend the entire height of the blank forming the sun screen. A horizontal fold line 66 may optionally be formed at the base of the triangular portion 62. Similarly, a pair of diagonal fold lines 64 and 65 extend from the apex of the triangle only to the height of its base, forming wing panels 70 and 72. A horizontal fold line 77 divides the portion of the blank below the triangular portion into a pair of base panels 75 and 78. While wing panels similar to those of the first embodiment are provided, the sun screen of the second embodiment cannot be folded into similar storage configuration.

FIG. 8 shows a typical installation of the sun screen 60 in a windshield. The base panel 78 rests on the dashboard 54, and the apex of the triangular portion 62 is positioned behind the rear view mirror 56. The wing panels 70 and 72 bend inwardly to accommodate the narrowing of the windshield but do not extend down to the dashboard. In the case of a shorter windshield, the blank can be folded at the line 66, in which the configuration in the windshield is similar to the sun screen 10 as shown in FIG. 4.

A third embodiment of the present invention is shown in FIGS. 9–12. FIG. 9 shows a sun screen 100 in the form of a flat blank cut and scored to accomplish the purpose of the present invention. The blank is generally rectangular in shape, and defines a bottom edge 115, top edge 116, left side edge 117 and right side edge 118. The corners, lower left 120, lower right 121, upper left 122 and upper right 123, are rounded. The bottom edge 115 is slightly beveled near the corners 120 and 121 at 115*a* and 115*b*, respectively, so as to prevent interference of the lower corners upon folding, as shown in FIG. 10. The side edges 117 and 118 are also slightly beveled near the corners 122 and 123 to make the width of the sun screen 100 somewhat narrower so as to fit better at the top of automobile windshields.

A generally triangular central panel 126 is defined by a first diagonal fold line 132, which extends from a point, spaced a short distance from the midpoint of the bottom edge 115 toward the side edge 118, to the upper right corner 123; by a second diagonal fold line 133, which extends from a point, spaced a similar amount on the other side of the midpoint of the bottom edge 115, to the upper left corner 122; and by the top edge 116. Thus, the apex of the triangle is at the bottom center of the blank, the sides are the fold lines 132 and 133, and the base is the top edge 116. The fold lines 132 and 133 also define right and left wing panels 135 and 136, respectively, and foldably connect the wing panels to the central panel.

A third diagonal fold line segment 140 extends from the center of the top edge 116 at point 138 toward the lower right corner 121, at approximately a forty-five degree angle from the top edge, terminating at the first fold line 132. A similar fourth fold line segment 141 extends from the point 138 to the second fold line 133. From the point at which the segment 140 meets the fold line 132, a fifth fold line segment 142 extends to the right side edge 118 at a point spaced slightly upwardly from the lower right corner 121. The segment 142 is positioned such that when the right wing panel 135 is folded about the fold line 132 onto the central panel 126, the segment 142 will lie along the segment 140, as shown in FIG. 10. A sixth fold line segment 143 is similarly positioned extending from the second fold line 133 to a point spaced from the lower left corner 120. The segment 143 lies along the segment 141 when the left wing panel 136 is folded as shown in FIG. 10.

Adjacent to the bottom center of the blank, between the points at which the fold lines 132 and 133 intersect the bottom edge 115, a generally horizontal slit 154 is cut in the central panel 126. The terminal points of the slit 154 may be relieved by downwardly curving cuts as shown, thereby creating a flap of material that may be folded out of the plane of the blank to form a slot for use as a locking mechanism described below.

The blank may optionally be provided with a removable section 130 located at the top center of the blank. The section 130 is defined by perforated tear scores 127, 128 and 129, which form, with the top edge 116, a rectangular section of the blank material. This section 130 may be manually removed from the remainder of the blank by tearing along the tear scores. However, this need only be done if necessary to accommodate a rear view mirror assembly 56 which in some vehicles may block the installation of the sun screen. Preferably, the top edge 116 is recessed as at 131 at the location of the section 130. A hole 155 is cut through the blank in the center of the section 130 for hanging the sun screen prior to removal of the section 130. The recess 131 exposes the hole 155 in the folded configuration of the sun screen, as shown in FIG. 11.

In the preferred embodiment of the invention, the removable section 130 is printed with indicia rendering the section 130 useful as a discount coupon redeemable in the conventional manner. Thus, the sun screen 100 may provide display space for advertising as well as a promotional coupon associated with a functional element of the sun screen.

The blank is crossed by two optional horizontal fold lines, the function of which is similar to that of the horizontal fold lines 45 and 47 of the first embodiment. A first horizontal fold line 145 is parallel to and spaced downwardly from the top edge 116. Fold line 145 may advantageously be placed at about one-quarter of the distance from the top edge to the bottom edge. A second horizontal fold line 147 extends across the blank parallel to the bottom edge, preferably spaced at about one-quarter of the distance from the bottom edge to the top edge. A base panel 148 is defined along the bottom of the blank by the fold line 147.

The blank also includes optional seventh and eighth diagonal fold lines 150 and 151. The fold line 150 extends from the top edge 116 to the side edge 118 spaced inwardly from the upper right corner 123, crossing fold lines 132 and 145, and forming an upper right corner panel 152. The fold line 151 extends from the top edge 116 to the side edge 117 spaced inwardly from the upper left corner 122, crossing fold lines 133 and 145, and forming an upper left corner panel 153. The upper corner panels yield to fit narrow windshields, and the fold lines 150 and 151 assist when the blank is locked in its folded configuration, as explained below.

The fold lines of the preferred embodiment described above are positioned to permit folding of the blank into a storage configuration shown in FIG. 11. Thus, the first and second diagonal fold lines 132 and 133 each form angles a of about 50 degrees with the top and bottom edges. The third and fourth fold lines 140 and 141 meet the fold lines 132 and 133, respectively, at angles b (opening toward the top edge) of about 85 degrees. The fifth and sixth fold lines 142 and 143 also meet the fold lines 132 and 133, respectively, at angles b (opening toward the side edges) of about 85 degrees. The second and third fold lines 140 and 141 form angles c of about 45 degrees with the top edge. The fifth and sixth fold lines 142 and 143 form angles d of about 55 degrees with the side edges. The seventh and eighth fold lines 150 and 151 form angles e of about 90 degrees with the fold lines 132 and 133, respectively. The scope of the invention is not intended to be limited to the above set of angles.

Referring now to FIGS. 10 and 11, the sequence of steps for folding the sun screen 100 into a storage configuration is shown. As was the case with the first embodiment shown in FIGS. 1–3, an advantage of the present invention is that only four folds are required to collapse the sun screen 100 into its storage configuration. Initially, the right and left wing panels 135 and 136 are folded about the first and second fold lines 132 and 133, respectively, onto the central panel 126. The trimmed sections 115a and 115b of the bottom edge meet at the center of the blank, and the fold line segments 142 and 143 lie along the segments 140 and 141, respectively. This intermediate configuration is shown in FIG. 10. Then, the upper corners 122 and 123 are folded about the double fold lines 141/143 and 140/142 to place the upper corners in positions slightly overlying the slit 154 adjacent to the bottom center of the blank. The folded sun screen now is generally in the shape of a quadrilateral with the halves of the top edge 116 lying adjacent to one another diagonally across the quadrilateral.

The top corners 122 and 123 may now be inserted through the slit 154 to retain or lock the sun screen in its storage configuration, as shown in FIG. 11. Slight bending of the two-layer corners prior to insertion into the slit is facilitated by the configuration of the fold lines 150 and 151. After folding, the fold lines 150 and 151 are folded onto themselves about fold lines 132 and 133, respectively. A weakening is thus created, making it easier to bend a small triangular portion adjacent to the corners 122 and 123 for insertion into the slot 154.

The sun screen 100 is shown installed in a vehicle windshield in FIG. 12. The wing panel 136 is folded toward the interior of the vehicle, and the upper corner panel 153 has also yielded inwardly to fit the narrowing profile (not shown) of the vehicle. The bottom edge 115 rests on the dashboard 54 and is folded with wing panels. Thus, the wing panels are positioned as struts which assist in supporting the sun screen in an upright position.

An additional embodiment to the present invention is shown in FIGS. 13–15. FIG. 13 shows sun screen 200 in the form of a flat blank cut and scored to accomplish the purpose of the present invention. The blank is generally rectangular in shape, and defines the bottom edge 202, top edge 204, left side edge 206, and right side edge 208. The corners, lower left 210, lower right 212, upper left 214, and upper right 216, are rounded. The bottom edge 202 is slightly beveled near the corners 210 and 212, at 218a and 218b, respectively, so as to prevent interference of the lower corners upon folding, as shown in FIG. 14. The side edges 206 and 208 are also slightly beveled near the corners 214 and 216, to make the width of the sun screen 200 somewhat narrower so as to fit better at the top of automobile windshields.

A generally triangular panel 220 is defined by a first diagonal fold line, a second diagonal fold line, and by the bottom edge 202. The first diagonal fold line comprises a pair of non-collinear first fold line segments 222a and 222b joined at one end 223 of each of the first fold line segments. The first fold line segment 222a extends from a point, spaced a short distance from the mid-point of the top edge 204, to generally the lower right corner 212 and terminates generally midway between the top edge 204 and the bottom edge 202. The other first fold line segment 222b extends generally from the lower right corner 212 towards the center of the top edge 204 and terminates generally midway between the top edge 204 and the bottom edge 202 such that the line segment 222a and the line segment 222b connect at their terminii and are non-collinear; i.e., the angle created by the line segments is not equal to 180°.

The second diagonal fold line comprises a pair of non-collinear line segments 224a and 224b joined at one end 225 of the second diagonal fold line segments. The second diagonal fold line extends from a point, spaced a similar amount as on the other side of the midpoint of the top edge 204 to the lower left corner 210.

The other second fold line segment 224b extends generally from the lower left corner 210 towards the center of the top edge 204 and terminates generally midway between the top edge 204 and the bottom edge 202 such that the second diagonal fold line segment 224a and the second diagonal line segment 224b connect at their terminii and are non-collinear.

Thus, the apex 230 of the triangle 220 is at the top center of the blank, the sides are the fold line segments 222a/222b, and 224a/224b, and the base is the bottom edge 202. The fold line segments 222a/222b, and 224a/224b also define right and left wing panels 226 and 228 respectively, and foldably connect the wing panels to the central panel.

A third diagonal fold line 232a/232b extends from the upper right corner to a point spaced a short distance from the midpoint of the bottom edge 202 toward the right edge 212, at an approximately 45 degree angle from the bottom edge. A similar fourth fold line 236a/236b extends from the upper left corner 214 and extends to a point spaced a short distance from the midpoint of the bottom edge 202 toward the left side 210 at an approximately 45 degree angle from the bottom edge.

The blank is crossed by two optional horizontal fold lines, the function of which is similar to that of the horizontal fold lines 45 and 47 of the first embodiment. A first horizontal fold line 254 is parallel to and spaced downward from the top edge 204. Fold line 254 may advantageously be placed at about one quarter of the distance from the top edge to the bottom edge. A second horizontal fold line 256 extends across the blank parallel to the bottom edge 202, preferably spaced at one quarter the distance from the bottom edge 202 to the top edge 204. A base panel 257 is defined along the bottom of the blank below the fold line 256.

The blank also includes optional seventh and eighth diagonal fold lines 260 and 262. The fold line 260 extends from the bottom edge 202 to the side edge 208 spaced inwardly from the lower right corner 212, crossing the intersection of fold line segment 222b and horizontal fold line 256, and forming a lower right corner panel 261. The fold line 262 extends from the bottom edge 202 to the side edge 206 spaced inwardly from the lower left corner 210, crossing the intersection of fold lines 224b and 256 and forming a lower left corner panel 263. The lower corner panels yield to fit narrow windshields, and the fold lines 260 and 262 assist when the blank is locked and is folded configuration, as explained below.

Located at the lower left and right corners are tabs 242 and 243 which are cut into the corner panels 263 and 261, respectively. The tabs 242 and 243 have a rounded edge 246 and the lower panel 263 has a beveled cut 248 along one edge near the tab. A slit 244 is cut into the wing panel 228 near the top edge 204 spaced a short distance from the apex 230 toward the left edge 206. The slit 244 has a generally inverted U-shape configuration and a size to receive a tab 242. The slit 244 is angled slightly to facilitate insertion of the tab 242. A similar slit 245 is located near the top edge 204 in the wing panel 226, spaced a short distance from the apex 230 toward the right edge 208. The slit 245 likewise has an inverted U-shape configuration and is sized to receive a tab 243. The slit 245 is angled slightly to facilitate the insertion of a tab 242 when the blank is folded. The beveled cut 248 also makes easier insertion of the tabs 242 and 245 into the slits 244 and 245. A slit 249 is cut near the tabs 242 and 243 to relieve the strain placed on the material when inserting the tabs into slits 244 and 245.

The blank may optionally be provided with a removable section 250 located at the top center of the blank. The section 250 is defined by perforated tear scores 250a, b, and c, which form, with the top edge 204, a rectangular section of the blank material. The section 250 may be manually removed from the remainder of the blank by tearing along the tear scores. However, this need only be done if necessary to accommodate a rear view mirror assembly 56, which in some vehicles may block the installation of the sun screen. Preferably the top edge 204 is recessed as at 251 at the location of the section 250. A hole 252 is cut through the blank in the center of the section 250 for hanging the sun screen prior to removal of the section 250. The recess 251 exposes the hole 252 in the folded configuration of the sun screen, as shown in FIG. 15.

In this embodiment of the present invention, the removable section 250 is printed with indicia rendering the section 250 useful as a discount coupon redeemable in the conventional manner. Thus, the sun screen 200 may provide display space for advertising as well as a promotional coupon associate with a functional element of the sun screen.

The fold lines of the preferred embodiment described above are positioned to permit folding of the blank into a storage configuration shown in FIG. 15. Thus, the first diagonal fold line segments 222a and 224a each form angles a of about 145 degrees with the top edge. The first and second fold line segments 222b and 224b form angles d of about 55 degrees with the side edges. The fold lines 222a and 224a meet the fold lines 232b and 236b, respectively, at angles b (opening toward the top edge) of about 85 degrees. Thus, non-collinear fold line segments 222a and 222b form an angle of about 170 degrees. Non-collinear fold line segments 224a and 224b form a similar angle. Fold line segments 232a, 232b, 236a and 236b each form angles a of about 50 degrees with the top and bottom edges. The fold lines 260 and 262 each form angles e of about 90 degrees with the fold lines 222b and 224b, respectively. The scope of the invention is not intended to be limited to the above set of angles.

Referring now to FIGS. 14 and 15, the sequence of steps for folding the sun screen 200 into a storage configuration is shown. An advantage of the present invention is that only four folds are required to collapse the sun screen 200 into a storage configuration. Initially, the right and left wing panels 226 and 228 are folded about the first and second fold lines 222a/222b and 224a/224b, respectively, onto the central panel 220. Because of the non-collinearity of line segments 222a/222b and 224a/224b, when folded along those lines, the lower right and left corners 212 and 210 are encouraged upward from out of the plane of the panel toward the apex 230. This encouraged folding occurs about fold lines 232a/232b and 236a/236b such that the fold lines 232a and 236a fold onto the central panel 220 proximate to but offset from the fold lines 232b and 236b, respectively. The offset of the fold lines reduces the strain placed on the fold lines 232b and 236b from the amount of material being forced into the fold crevices created by the fold lines. This results in decreased tearing of the outside material along the fold lines 232b and 236b. This intermediate configuration is shown in FIG. 14. Then, the lower corners 212 and 210 are folded about the double fold lines 232a/232b and 224a/224b, respectively, to place the lower corners 210 and 212 in positions such that the tabs 243 and 242 slightly overlay the slits 245 and 244. The folded sun screen is now generally in the shape of a quadrilateral with the halves of the bottom edge 202 lying adjacent to one another diagonally across the quadrilateral, as shown in FIG. 15. When folded, the lower corners 210 and 212 and side edges 206 and 208 are aligned such that the tabs 242 and 243 are positioned on top of the slits 244 and 245, yet the edges 206 and 208 do not overlap. This orientation permits the easy insertion of the tabs 242 and 243 into the slits 244 and 245.

The top corners 210 and 212 may now be locked by inserting the tabs 242 and 243 through the respective slits 244 and 245 to retain or lock the sun screen in a stored configuration, as shown in FIG. 15. A slight bending of the two layer corners prior to insertion into the slit is facilitated by the configuration of the fold lines 260 and 262. After the sun screen is folded, the fold lines 260 and 262 are folded onto themselves about the fold lines 222b and 224b, respectively. A weakening is thus created, making it easier to bend a small triangular portion adjacent to the corners 210 and 212 for insertion of the tabs into their respective slits. The beveled edge 248 of the corner panels and rounded corners 246 and the tabs make it easier for the tabs 242 and 243 to be inserted into the slits.

Thus, it will be understood that a sun screen embodying the present invention has good transverse and vertical rigidity and accommodates readily to the shape of modern windshields. The sun screen folds readily into a compact package for storage with a minimum number of folds, and presents a large area for the printing of messages or advertising. Tearing of material resulting from folding of double layers of material may be avoided using the structure of the last-described embodiment.

While this invention has been described in detail with particular reference to preferred embodiments thereof, it will be understood that variations and modifications can be effected within the spirit and scope of the invention as described herein before and as defined in the appended claims.

What is claimed is:

1. A sun screen having an expanded configuration adapted for placement in a vehicle window and a folded configuration for storage, comprising:
   a generally rectangular sheet of material defining upper right, upper left, lower right, and lower left corners, and top and bottom edges;
   a first fold line extending from the center of said top edge to a point adjacent to said lower right corner so as to define a generally triangular right wing panel which includes said upper right corner, said first fold line comprising a pair of non-collinear fold line segments joined at one end of each of said first fold line segments;
   a second fold line extending from the center of said top edge to a point adjacent to said lower left corner so as to define a generally triangular left wing panel which includes said upper left corner, said second fold line comprising a pair of non-collinear line segments joined at one end of each of said first fold line segments;
   a third fold line segment extending from said upper right corner to the point at which said first fold line segments meet;
   a fourth fold line segment extending from adjacent to the center of said bottom edge to the point at which said first fold line segments meet;
   a fifth fold line segment extending from said upper left corner to the point at which said second fold line segments meet; and
   a sixth fold line segment extending from adjacent to the center of said bottom edge to the point at which said second fold line segments meet;
   said wing panels being foldable about said first and second fold lines such that the folding of said sheet about said non-collinear first fold line and non-collinear second fold line encourages the folding of said third and fourth fold line segments in a manner so as to place said third fold line segment adjacent the original plane of said sheet at a position offset from the orientation of said fourth fold line segment, and said fifth fold line adjacent the original plane of said sheet at a position offset from the orientation of said sixth fold line, whereby said lower corners fold to positions adjacent to the center of said top edge of said sheet, whereby said sun screen is in said folded configuration.

2. The sun screen of claim 1, further comprising locking means for retaining said lower corners in positions adjacent to the center of said top edge.

3. The sun screen of claim 2, wherein said said locking means comprises a tab transversely cut into each of said lower corners and a slit cut into each side of said wing panel on either side of said center of said top edge such that when said sun screen is folded said slit can receive said tab.

4. The sun screen of claim 1, wherein said sun screen further defines a first horizontal fold line spaced upwardly from the bottom edge of said sheet.

5. The sun screen of claim 4, wherein said sun screen further defines a second horizontal fold line spaced downwardly from the top edge of said sheet.

6. The sun screen of claim 5, wherein when said first and second horizontal fold lines folded said sheet presents a reduced size for placement in a vehicle with a smaller window.

7. The sun screen of claim 1, further comprising a seventh fold line adjacent said lower right corner extending from said bottom edge to a right side edge and intersecting said first fold line at a generally perpendicular angle.

8. The sun screen of claim 7, further comprising an eighth fold line adjacent said lower left corner extending from said bottom edge to a left side edge and intersecting said second fold line at a generally perpendicular angle.

9. The sun screen of claim 8, wherein said seventh fold line is positioned to lie adjacent to each of said lower corners when said lower corners are folded to said position adjacent to the center of said top edge, so as to facilitate bending of said lower corners for insertion of said tabs into said slits.

10. The apparatus of claim 1, further comprising a removable section extending inwardly from the center of the top edge of said sheet, said removable section comprising a redeemable coupon.

11. A sun screen having an expanded configuration adapted for placement in a vehicle window and a folded configuration for storage, comprising:
   a generally rectangular sheet of material defining upper right, upper left, lower right, and lower left corners, and top and bottom edges;
   a first fold line extending from the center of said top edge to a point adjacent to said lower right corner so as to define a generally triangular right wing panel which includes said upper right corner, said first fold line comprising a pair of non-collinear first fold line segments joined at one end of each of said first fold line segments;
   a second fold line extending from the center of said top edge to a point adjacent to said lower left corner so as to define a generally triangular left wing panel which includes said upper left corner, said second fold line comprising a pair of non-collinear second fold line segments joined at one end of each of said second fold line segments;
   such that when said wing panels are folded inwardly, said lower right and left corners are encouraged to fold to positions adjacent to the center of said top edge of said sheet.

* * * * *